April 30, 1946.　　L. PIERCE ET AL　　2,399,380
DOUBLE ARMATURE CONTACTORS
Filed Dec. 24, 1943　　5 Sheets-Sheet 1

WITNESSES:

INVENTORS
Lawrence Pierce and
Ralph B. Immel.
BY
ATTORNEY

April 30, 1946.   L. PIERCE ET AL   2,399,380
DOUBLE ARMATURE CONTACTORS
Filed Dec. 24, 1943   5 Sheets-Sheet 2
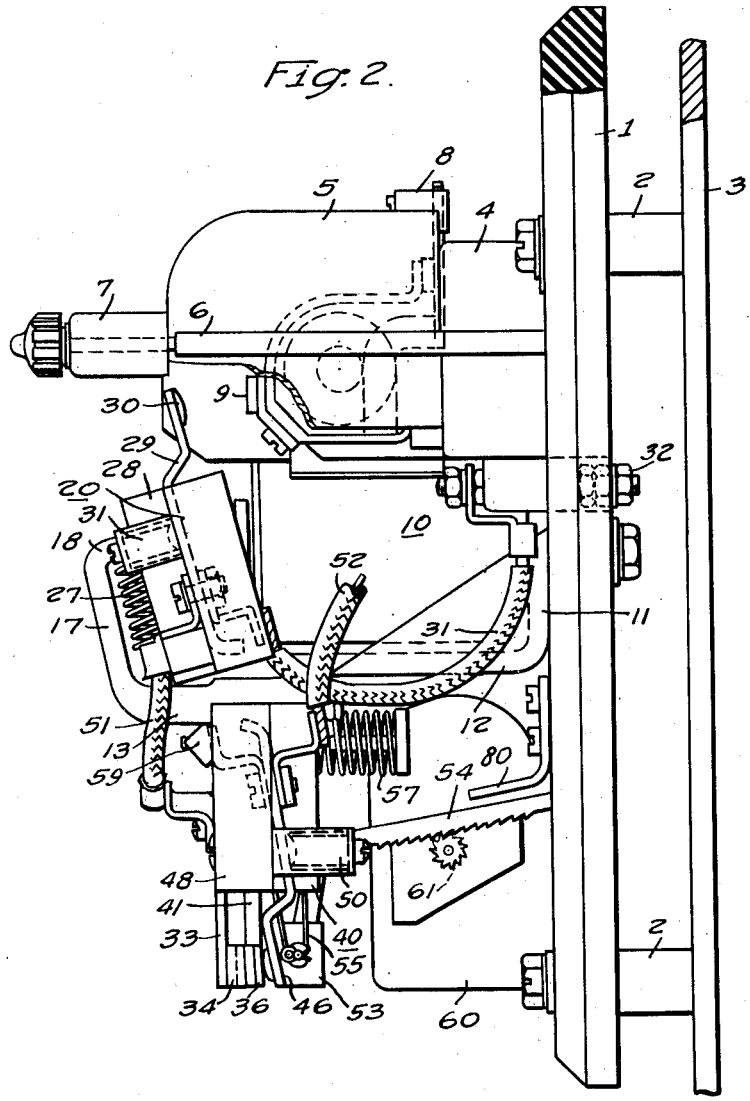
WITNESSES:
INVENTORS
Lawrence Pierce and
Ralph B. Immel.
BY
ATTORNEY April 30, 1946.  L. PIERCE ET AL  2,399,380
DOUBLE ARMATURE CONTACTORS
Filed Dec. 24, 1943  5 Sheets-Sheet 3
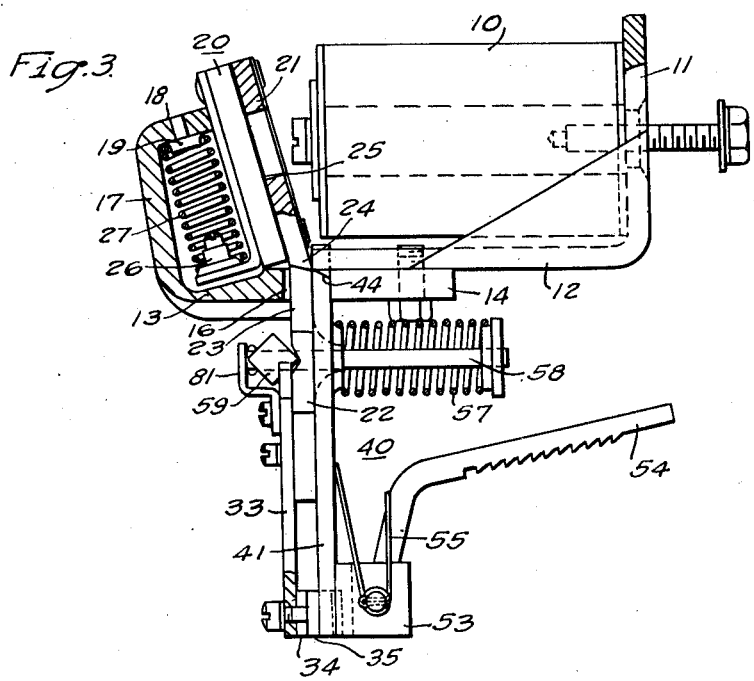
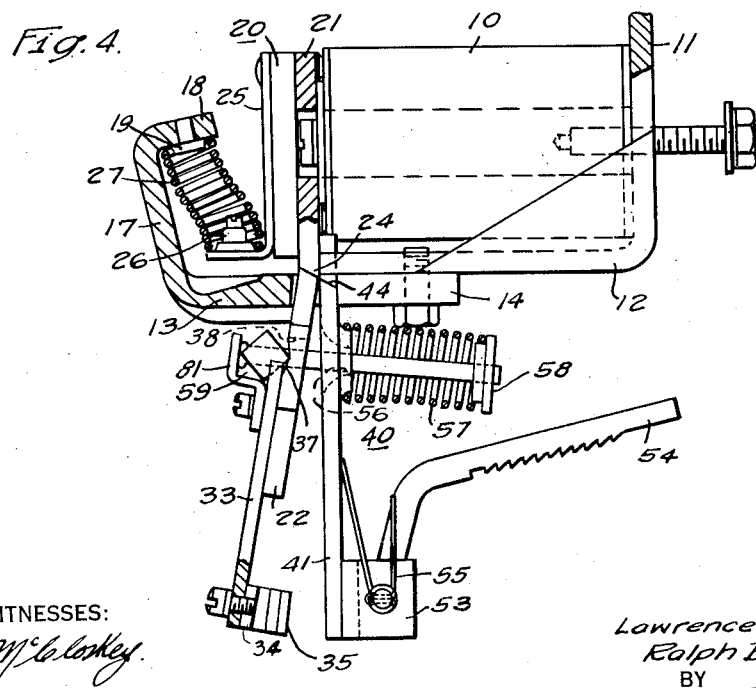
WITNESSES:
E. A. McCloskey
Curt M. Avery
INVENTORS
Lawrence Pierce and
Ralph B. Immel.
BY
Paul E. Friedemann
ATTORNEY April 30, 1946.  L. PIERCE ET AL  2,399,380
DOUBLE ARMATURE CONTACTORS
Filed Dec. 24, 1943  5 Sheets-Sheet 4
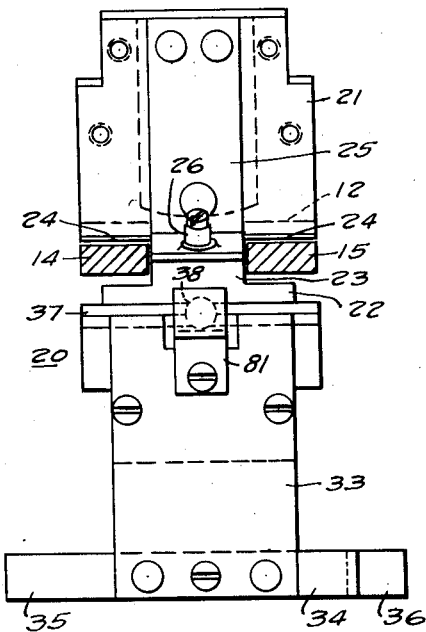
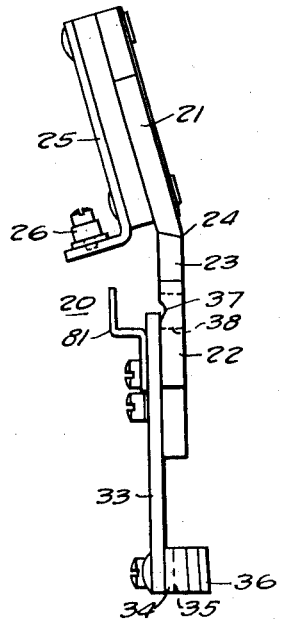
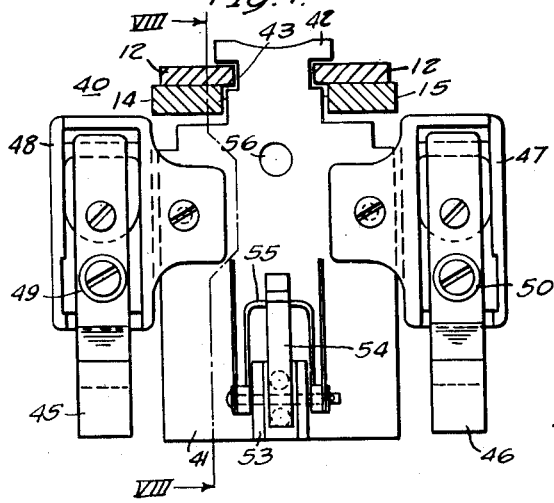
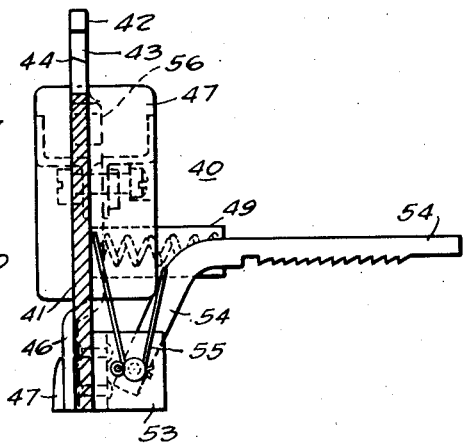
WITNESSES:
INVENTORS
Lawrence Pierce and
Ralph B. Immel.
BY
Paul E. Friedemann
ATTORNEY

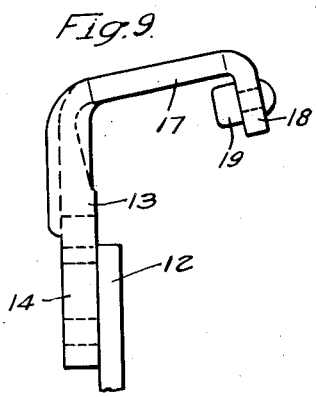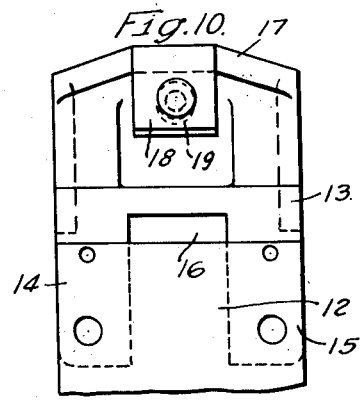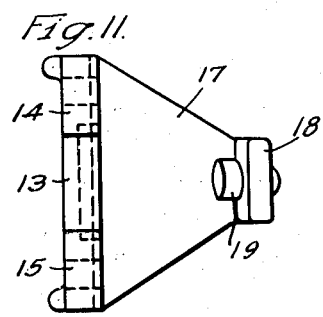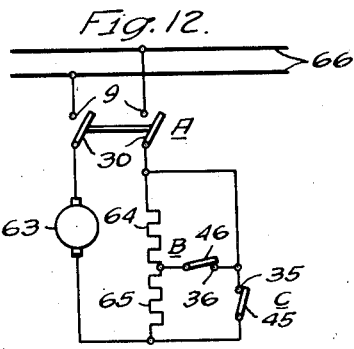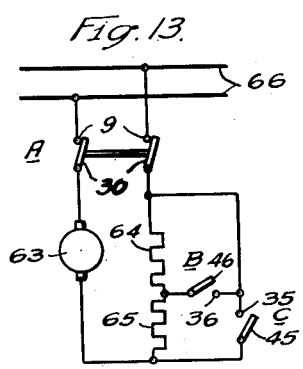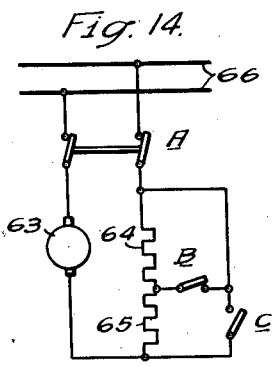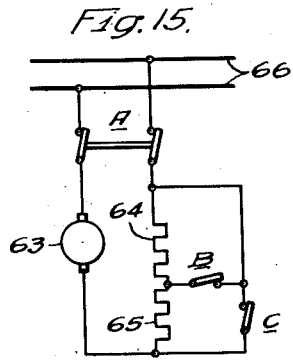

Patented Apr. 30, 1946

2,399,380

UNITED STATES PATENT OFFICE 2,399,380

DOUBLE ARMATURE CONTACTORS

Lawrence Pierce, Edgewood, and Ralph B. Immel, Wilkinsburg, Pa., assignors to Westinghouse Electric Corporation, East Pittsburgh, Pa., a corporation of Pennsylvania Application December 24, 1943, Serial No. 515,508

15 Claims. (Cl. 200—97)

Our invention relates to timing relays, contactors, or the like apparatus for actuating two or more electric contacts in delayed succession, and in one of its aspects particularly to automatic time starters for direct current motors.

It is an object of the invention to provide apparatus of the just-mentioned type whose movable armature and contact assemblies are of simple and space saving design while ensuring a reliable operation under exacting operating conditions.

More specifically, our invention aims at devising an electromagnetic double-armature contactor whose internal friction is considerably reduced over that of the known contactors of this type. Another object is to design such a contactor in a manner that its movable parts are protected from being dislodged when the apparatus is exposed to high intensity shock or vibration as occurring, for instance, on board of war vessels.

A further object of our invention is to provide a time contactor, motor starter or the like apparatus of the relay type in which one contact is quickly closed or opened while a second and third contact are actuated successively upon elapse of a given timing period after the operation of the first contact, while, when restoring the original condition of the apparatus, all three contacts are returned without delay.

Another object is to simplify the manufacture and assembly of the movable armature and contact assemblies of an electromagnetic time starter or relay of the double-armature type. A more specific object in this respect is to employ a single part for securing both armature assemblies to the stationary frame or support of the apparatus and interlocking these assemblies with each other and with the frame, the same part providing also an abutment for limiting the operating motion of the assemblies and serving further for accommodating spring means for biasing them towards a given position, thus simplifying the design and facilitating the assembly or disassembly of the apparatus.

A still further object of our invention aims at improving the kinematic operating conditions of a double-armature relay or timing contactor by pivoting the two movable assemblies about the same, or substantially the same, pivot axis.

An object is also to eliminate in double-armature type time contactors all bearing pins and bushings heretofore used in such devices for journalling the two movable armature assemblies in order to reduce the space requirements for the pivot bearings and permit manufacture from strap material.

These and other objects of the invention will be apparent from the following description in conjunction with the accompanying drawings, in which Figs. 1 through 11 represent views and details of a single embodiment of a two-step time starter for direct current motors or the like apparatus, while Figs. 12 through 15 serve to elucidate the application and operation of the same starter more in detail.

Figs. 3 and 4 show part sectional views of the magnet and double-armature assembly of the starter in two different operating positions.

Fig. 5 is a front view of the main armature assembly, with its main contact removed, seen from the left of Fig. 2, and Fig. 6 is a side view of the same assembly.

Fig. 7 shows a bottom view of the second movable assembly seen from the right of Fig. 2, and Fig. 8 is a part-sectional side view of the same assembly, the section being taken along the dot-and-dash line marked VIII—VIII in Fig. 7.

Figs. 9, 10 and 11 are three different views of a bracket which forms part of the starter and serves to secure and interlock the two assemblies to the supporting structure and magnet.

Fig. 12 represents schematically the contacts of the starter in combination with the circuit of a direct current motor, and Figs. 13 through 15 are similar diagrams showing the contacts in different phases of starter operation.

Figure 1:
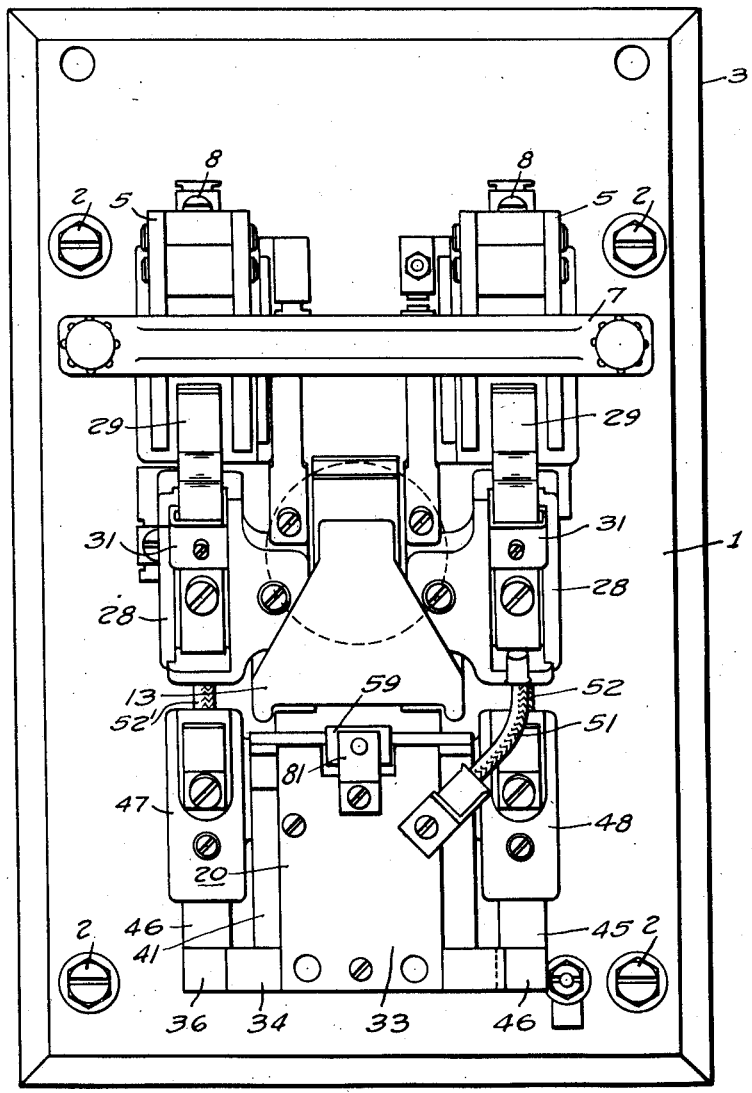
Fig. 1 is a front view and Fig. 2 a lateral view of the motor starter.

Referring to Figs. 1 through 11, and with particular reference to the figures hereinafter mentioned in parentheses, the illustrated time starter has an insulating base plate 1 mounted by means of bolts and spacers 2 on a mounting panel or wall 3. A projecting portion 4 of the base 1 carries a pair of arcing chambers denoted by 5 (Figs. 1 and 2) which are fastened to the base by means of bolts 6 and a cross bar 7 held by the bolts. A contact terminal 8 is provided for each of the two arcing chambers. This terminal is mounted on a strap which carries a stationary contact 9 within the appertaining arcing chamber 5 (Fig. 2).

Secured to the insulating base 1 is further an electromagnet whose coil 10 surrounds a magnet core attached to a magnetic frame 11 of substantially angular shape. The limb 12 of the angular frame extends in parallel to the magnet core at a right angle to the insulating base 1 and carries at its extremity a bracket 13 (Figs. 1, 2, 9, 10 and 11). The bracket has two legs 14 and 15 which, according to Fig. 10, are screwed to the limb 12 of the magnetic frame so as to form a slot 16 for the passage of the two armatures to be mentioned hereinafter. The top portion 17 of the bracket 13 slopes towards an end portion 18 which extends substantially at a right angle to the top portion and carries a projection 19 serving as an abutment for the main armature spring. The bracket consists preferably of a casting.

The above described elements of the contactor form in totality the stationary structure of the apparatus.

A movable main armature denoted as a whole by numeral 20 (Figs. 2, 3, 4, 5 and 6) is pivotally linked to the stationary structure for cooperation with the electromagnet. This armature forms substantially a lever whose arm 21 lies adjacent to the magnet. The other arm 22 of the armature lever is separated from arm 21 by a section 23 of reduced width (Figs. 5 and 6) which extends through the above-mentioned slot 16 (Fig. 10) and hence is straddled by the two legs 14 and 15 of the bracket 13 (Fig. 5). The sides of arm 21 abutting against the legs 14 and 15 of the bracket are so shaped as to form a knife type pivot edge 24. This edge is in engagement with a dihedral pivot bearing formed by the corner between the end of the limb 12 and the legs 14 and 15 of the bracket 13 (Figs. 3 and 4). Hence, the armature 20 is capable of angular motion towards and away from the magnet about the pivot edge 24.

An angular strap 25 is firmly secured to the arm 21 of armature 20 and carries a projection 26 (Figs. 3, 4, 5 and 6). The main armature spring 27 of the contactor, consisting of a helical compressing spring, is inserted between the projection 18 of the bracket 13 and the just-mentioned projection 26 of the angular strap 25 (Figs. 3 and 4). This spring biases the armature 20 away from the magnet. Consequently, when the magnet is deenergized, the arm 21 of the armature is forced towards the stop formed by the extremity of the bracket end 18 (Fig. 3). The force exerted by spring 27 on the armature has a component directed towards the dihedral pivot bearing so that the pivot edge 24 of the armature is safely held in engagement therewith.

Two insulating holders both denoted by 28 (Figs. 1 and 2) are attached to the arm 21 of armature 20. Each of these holders carries a contact arm 29 provided with a movable contact 30 (Fig. 2) for cooperation with the stationary contact 9 within the arcing chamber 5. The contact arm is angularly movable relative to its holder 28, but is normally pressed flat against a supporting surface of the holder 28 by means of a contact spring arranged in a saddle 31. As a result, the contact arm 29 participates in the angular opening and closing motion of the armature without performing a motion relative thereto so long as the movable contact 30 is disengaged from the stationary contact 9. However, at the end of a closing motion and after the contact 30 has abutted against the stationary contact 9, the arm 29 will yield relative to its holder 28 in order to permit a limited overtravel of the armature under compression of the contact spring in saddle 31. Thus the necessary contact pressure between the main contacts of the relay is ensured in a manner customary and well known for such type apparatus.

A plate 33 is firmly attached to the arm 22 of armature 20 (Figs. 1, 3, 4, 5 and 6). This plate consists of conductive material such as steel and carries at its free end a cross bar 34 of conductive strip material, for instance also of steel, which forms contacts at its ends 35 and 36. The end 36 is bent in a double angle (Figs. 2, 5 and 6) so that it extends farther towards the base of the contactor than the contact end 35. A notch 37 is formed at one side of the arm 22 and a bore 38 passes through the arm in the center of the notch 37. In order to accommodate the fastening and pivot means for a secondary armature spring referred to hereinafter.

The second armature of the contactor is denoted as a whole by numeral 40 (Figs. 1, 2, 3, 4, 7 and 8). More accurately, this second armature represents merely a movable assembly for actuating a set of contacts to cooperate with the above-mentioned contacts 35 and 36, but is not directly actuated by the relay magnet. Hence, the second armature or assembly need not contain magnetic material, although such material can be used without disadvantage. The second movable assembly comprises a plate-shaped member 41 which has a T-shaped configuration at one end 42 so as to form a constricted portion at 43. This constricted portion passes through the slot 16 (Fig. 10) so that it is straddled by the legs 14 and 15 of the bracket 13. The edge portions facing the legs 14 and 15 at the side away from the T-shaped end 42 of plate 41 are designed as a knife-type pivot edge 44 (Figs. 3, 4, 7, 8) which rests against the dihedral pivot bearing formed by the armature 20 and the legs 14 and 15 of the bracket 13. According to Figs. 3 and 4, the pivot edges 24 and 44 are adjacent to each other so that the main armature assembly and the secondary assembly have substantially the same pivot axis.

Two contacts 45 and 46 formed by respective contact straps are mounted on insulating holders 47 and 48, respectively, which are firmly secured to the plate 41 (Figs. 7 and 8) of assembly 40. The strap contact 45 is angularly movable with respect to its holder 48, but is normally held against the holder by means of a saddle and spring device 49. Similarly a strap contact 46 is held against its holder by a saddle and spring arrangement 50. The contacts 45 and 46 are arranged in cooperative relation to the contacts 35 and 36, respectively, of the main armature assembly so that the contact 45 is normally in engagement with contact 35 while contact 46 engages contact 36 (Fig. 2). A cable 51 connects the contact plate 33 of armature 20 and hence both contacts 35 and 36 with one of the main contact arms 29 of the armature assembly (Figs. 1 and 2). Another cable, 52, is attached to contact 45 and serves to connect it with a terminal (not illustrated) mounted on the insulating base 1 (Figs. 1 and 2). Contact 46 is connected by a cable 52' (Fig. 1) with a separate terminal (not illustrated) on base 1. These connections and terminals are provided for establishing certain circuit connections which will be described in a later place with reference to Figs. 12 through 15.

A bore 56 in the center axis of the armature plate 41 is so located as to be in registry with the above-mentioned bore 38 of the main armature. A helical compression spring 57 is arranged between the plate member 41 and an abutment mounted on a pin 58. This pin extends through the bores 56 and 38 and is attached to a pivot body 59 of square cross section which forms a pivot edge resting in the angular notch 37 (Figs. 3, 4, 5 and 7). The force exerted by spring 57 tends to hold the plate member 41 of the secondary assembly in phase-to-phase contact with arm 22 of the main armature assembly. At the same time the force of this spring biases the plate 41 towards the magnet so that the pivot edge 44 of the secondary assembly is held in engagement with its stationary pivot bearing. An angle piece 81 screwed onto the plate 33 (Figs. 1 to 6) serves to prevent the spring pivot bearing from being dislocated when the apparatus is subjected to heavy impact shock.

A U-shaped bearing 53 is firmly secured to the plate member 41 of the secondary assembly 40, and a rack 54 pivoted to this bearing is provided with a spring 55 which biases the rack 54 toward the ratchet pinion 61 of a timing device 60 mounted on base 1. The timing device may consist of an escapement mechanism as known and available for timing relays. Hence, its details do not form part of the invention proper. An angle piece 80 secured to the base 1 (Fig. 2) serves to prevent the rack 54 from jumping out of its proper position, especially when the apparatus is subjected to heavy shock.

When the electromagnet is deenergized the above-described assemblies assume the position illustrated in Figs. 2 and 3. In this position the main armature 20 is held against the stop 18 of bracket 13 so that the main contacts between 9 and 30 are open. At the same time the secondary assembly 40 is held by its spring 57 towards the arm 22 of the main assembly so that both contacts between 35 and 45, and between 36 and 46 are closed.

When the coil 10 of the electromagnet is energized, the arm 21 of the main armature is attracted and moves immediately into the position shown in Fig. 4 in opposition to the biasing force of the main spring 27. The secondary assembly 40 is at first retained in its original position by engagement of rack 54 with the ratchet 61 of the escapement mechanism. Hence, the spring 57 is also compressed. Consequently, contacts 35, 45 and 36, 46 are opened. Due to the action of this spring, the secondary assembly is gradually moved towards the main armature at a speed determined by the operation and setting of the escapement mechanism. After the lapse of the timing period the contacts 45 and 46 will approach the respective contacts 35 and 36. Due to the offset of contact 36, this contact will first engage the contact 46 while the engagement between contacts 45 and 35 occurs at a subsequent moment.

When the electromagnet is deenergized, the main spring 27 forces both assemblies 20 and 40 back into the original position. During this return motion, the rack 54 slides idle over the ratchet 61 so that the timing mechanism remains inoperative. As a result, the secondary assembly follows the main assembly immediately.

An example of a control operation for which the relay is applicable is elucidated by the circuit diagrams of Figs. 12 through 15. In these figures the main contacts between elements 9 and 30 of the above described contactor are designated by the letter "A." The first closing pair of contacts 36 and 46 between the main armature assembly and the secondary assembly is denoted by "B," while the subsequent reclosing pair of contacts 35 and 45 is denoted by "C."

A direct current motor 63 in series-connection with two starting resistors 64 and 65 is connected to a current source 66 through the contacts A, B and C.

In the inoperative condition of the contactor, the main contacts A are opened while the contacts B and C are closed in accordance with Fig. 12. The motor 63 is now disconnected. When energizing the contactor, its main contacts A are closed and both contacts B and C opened as shown in Fig. 13. As a result, the motor 63 is connected to the current source 66 through both series resistors 64 and 65 and starts running. At the same time, the timing mechanism of the contactor is effective to close contacts B and C upon lapse of its timing period. Near the end of this period, contact B is first closed while contact C remains open in accordance with Fig. 14. As a result the resistor 64 is shorted so that the motor is supplied with increased energization. Shortly later the contact C is also closed so that finally both resistors 64 and 65 are shorted as shown in Fig. 15 in order to operate the motor at full speed. When the contactor is deenergized the main contacts A are opened while contacts B and C remain closed so that the original condition according to Fig. 12 is restored.

It will be apparent from the foregoing description that a double-armature contactor according to the invention affords several essential advantages over those heretofore available. The fact that both movable assemblies are journaled to the stationary structure of the apparatus by means of knife-type pivot bearings reduces the internal friction to a considerable extend over the bolt or shaft pivots heretofore customary in such apparatus. The use of a pivot edge for linking the return spring of the secondary assembly to the main armature also contributes to the elimination of friction. At the same time, the space requirements of the two pivots are extremely small and the pivot axes lie so closely together that rotation of both assemblies occurs vertically about a common pivot axis. The above described application of dihedral pivot bearings and corresponding pivot edges permits further the use of strap material for the manufacture of the metal parts needed for these two assemblies thus simplifying the design and reducing the cost of manufacture.

In conjunction with these advantages, a contactor according to our invention is easy to assemble or disassemble since both armatures are held in position by a common fastening element, namely the bracket 13, which at the same time performs also the functions of forming part of the pivot bearings, accommodating the main armature spring, and limiting the angular interrupting motion of the main armature.

Another essential advantage of the invention lies in the fact that the two armature assemblies are mechanically interlocked with each other and with the stationary structure of the contactor. That is, both armatures are prevented from slipping out of engagement with their respective stationary pivot bearings due to the fact that their constricted portions are straddled by the bracket 13. As a result, a contactor according to the invention can be used to advantage in places where high impact shocks or vibrations are to be expected. Even very heavy shock forces are not able to permanently dislocate the movable elements of the apparatus with respect to the stationary structure.

Since it will be obvious to those skilled in the art that apparatus according to our invention can be modified in various respects without departing from the gist and essential features of the invention, we wish this specification to be understood as illustrative and not in a limited sense.

We claim as our invention:

1. Apparatus for actuating two contacts in delayed succession, comprising in combination a stationary structure including an electromagnet and forming a dihedral pivot bearing, a contact-actuating armature having a pivot edge engaging said bearing for angular motion relative to said magnet, said armature and said structure forming together another dihedral pivot bearing adjacent and in parallel to said first bearing, a contact-actuating member having a pivot edge engaging said other bearing for pivotal motion relative to said armature, spring means for biasing said armature and member toward said respective bearings, and a timing mechanism connected with said member for retarding its spring biased motion upon a change in position of said armature.

2. Apparatus for actuating two contacts in delayed succession, comprising in combination a stationary structure including an electromagnet and forming a dihedral pivot bearing, a contact-actuating armature having a pivot edge engaging said bearing for angular motion relative to said magnet, said armature and said structure forming together another dihedral pivot bearing adjacent and in parallel to said first bearing, a contact-actuating member having a pivot edge engaging said other bearing for pivotal motion relative to said armature, a spring disposed for biasing said armature away from said magnet and toward said first bearing, another spring disposed for biasing said member toward said other bearing and toward a given angular position relative to said armature, and a timing mechanism connected with said member for retarding its spring biased motion upon a change in position of said armature.

3. Apparatus for actuating two contacts in delayed succession, comprising an electromagnet, a contact-actuating armature pivotally connected with said magnet for angular motion between two positions relative to said magnet, a spring for biasing said armature away from said magnet, a contact-actuating member pivotally arranged for angular motion between two end positions relative to said armature, said armature and said member having substantially coinciding pivot axes, another spring disposed between said armature and said member for biasing said member for motion toward said armature, and a timing mechanism connected with said member for retarding its motion toward said armature upon attraction of said armature by said magnet.

4. Apparatus for actuating two contacts in delayed succession, comprising in combination a stationary structure including an electromagnet and forming a dihedral pivot bearing, a contact-actuating armature having a pivot edge engaging said bearing for angular motion relative to said magnet, said armature and said structure forming together another dihedral pivot bearing adjacent and in parallel to said first bearing, a spring disposed between said structure and said armature for biasing the latter away from said magnet and toward said first bearing, another spring disposed between said armature and said member for biasing the latter toward said armature and said other bearing, and a timing mechanism connected with said member for retarding its motion toward said armature upon attraction of said armature by said magnet.

5. Apparatus for actuating two contacts in delayed succession, comprising an electromagnet, a contact-actuating armature pivotally connected to said magnet for pivotal motion relative thereto and biased away from said magnet, a contact-actuating member having a knife-edge type pivot for angular motion relative to said armature, a spring disposed for exerting on said member a biasing force directed towards said armature and pivot, and a timing mechanism connected with said member for retarding its motion toward said armature upon attraction of said armature by said magnet.

6. Apparatus for actuating two contacts in delayed succession, comprising in combination a stationary structure including an electromagnet and a stationary contact, an armature assembly having a movable contact to engage said stationary contact and being pivotally connected with said structure for angular motion relative to said magnet, a spring for biasing said assembly in contact opening direction away from said magnet, a member pivotally arranged for angular motion relative to said armature, said armature and said member having a pair of cooperating contacts, a spring disposed for biasing said member toward said armature so as to normally maintain said contact pair in closed position, and a timing mechanism connected with said member for retarding its motion toward said armature upon attraction of said armature by said magnet, whereby said contact pair is opened when said stationary and movable contacts close and then reclosed upon elapse of a timing period.

7. Apparatus for actuating two contacts in delayed succession, comprising in combination a stationary structure including an electromagnet and a stationary contact, and forming a dihedral pivot bearing, an armature assembly having a movable contact to engage said stationary contact and forming a pivot edge engaging said bearing for angular motion relative to said magnet, a spring for biasing said assembly in contact opening direction away from said magnet and toward said bearing, said armature and said structure forming together another dihedral pivot bearing, a member having a pivot edge engaging said other bearing for angular motion relative to said armature, said armature and said member having a pair of cooperating contacts, a spring disposed for biasing said member toward said other bearing and said armature so as to normally maintain said contact pair in closed position, and a timing mechanism connected with said member for retarding its motion toward said armature upon attraction of said armature by said magnet, whereby said contact pair is opened when said stationary and movable contacts close and then reclosed upon elapse of a timing period.

8. Apparatus for actuating two contacts in delayed succession, comprising in combination a stationary structure including an electromagnet and forming a dihedral pivot bearing, a contact-actuating armature having a pivot edge engaging said bearing for angular motion relative to said magnet, a contact-actuating member having a pivot edge engaging said structure adjacent and in parallel to said bearing for angular motion relative to said armature, said armature and said member being loosely interlocked with said structure so as to limit shock motion of said armature and member away from said pivot bearing, spring means for biasing said armature and member toward said bearing, and a timing mechanism connected with said member for retarding its spring biased motion upon a change in position of said armature.

9. Apparatus for actuating two contacts in delayed succession, comprising in combination a stationary structure including an electromagnet and having a slot and a dihedral pivot bearing, said bearing having two portions located at both respective ends of said slot on one side of said slot, a contact-actuating armature passing through said slot and forming two pivot edges for engaging said bearing portions respectively and having an extended part on the other side of said slot, a spring for biasing said armature away from said magnet and toward said pivot bearing, said armature and said structure forming together another dihedral pivot bearing adjacent and in parallel to said first bearing, a contact-actuating member also passing through said slot and having a pivot edge for engaging said other bearing and being shaped so as to project over the ends of said slot to prevent dislodging of said member under shock, another spring disposed for biasing said member toward said other bearing and toward a given angular position relative to said armature, and a timing mechanism connected with said member for retarding its spring biased motion upon a change in position of said armature.

10. Apparatus for actuating two contacts in delayed succession, comprising an electromagnet, a bracket rigidly mounted on said structure and forming therewith a dihedral pivot bearing, a contact-actuating armature having a pivot edge engaging said bearing for angular motion of another dihedral pivot bearing adjacent and in parallel to said first bearing, a contact-actuating member having a pivot edge engaging said other bearing for pivotal motion relative to said armature, spring means for holding said armature and said member against said respective bearings while biasing said armature away from said magnet and said member toward a given angular position relative to said armature, said armature and said member having each a constricted portion in proximity of said bearings and said bracket forming a stop for limiting the spring biased motion of said armature and having two legs straddling said constricted portions to prevent dislodging of said armature and member under shock, and a timing mechanism connected with said member for retarding its spring biased motion upon a change in position of said armature.

11. A contactor comprising in combination an electromagnet, a bracket mounted on said magnet and forming therewith a dihedral pivot bearing, a contact-actuating armature having a pivot edge engaging said bearing for angular motion, a spring disposed between said bracket and said armature for biasing the latter toward said bearing and away from said magnet, said armature having a constricted portion adjacent to said pivot edge and extending substantially in parallel thereto, and said bracket forming a stop for limiting the spring biased motion of said armature and having two legs straddling said constricted portion to prevent dislodging of said armature under shock.

12. Apparatus for actuating two contacts in delayed succession, comprising in combination a stationary structure including an electromagnet and forming a dihedral pivot bearing, a contact-actuating armature having a pivot edge engaging said bearing for angular motion relative to said magnet, said armature and said structure forming together another dihedral pivot bearing adjacent and in parallel to said first bearing, a spring disposed between said structure and said armature for biasing the latter away from said magnet and toward said first bearing, a pin pivotally engaging said armature and extending through said member so as to project from the side of said member away from said armature, a spring disposed between said member and said pin and surrounding said pin on said side for biasing said member toward said armature and said other bearing, and a timing mechanism connected with said member for retarding its motion toward said armature upon attraction of said armature by said magnet.

13. Apparatus for delayed actuation of an electric contact upon actuation of another contact, comprising an electromagnet, a contact-actuating armature pivotally connected with said magnet for angular motion between two positions relative to said magnet, a spring for biasing said armature away from said magnet, a contact-actuating member pivotally arranged for angular motion between two end positions relative to said armature, spring means for biasing said member toward one of its end positions, a rack yieldingly mounted on said member and teethed for unidirectional transmission of motion, and escapement mechanism having a gear for engagement by said rack so as to retard the spring biased motion of said member relative to said armature while having no retarding effect on motion of said member in the opposite direction.

14. A time starter comprising in construction a stationary structure including an electromagnet and a stationary contact, an armature assembly having a movable contact to engage said stationary contact and being pivotally connected with said structure for angular motion relative to said magnet, a spring for biasing said assembly in contact opening direction away from said magnet, a member pivotally arranged for angular motion relative to said armature, said armature and said member having two pairs of contacts angularly displaced with respect to each other so as to be closed successively upon motion of said member toward said armature, a spring for biasing said member toward said armature so as to normally close said pairs of contacts, and a timing mechanism connected with said member for retarding its motion toward said armature upon attraction of said armature by said magnet.

15. A time starter comprising in construction a stationary structure including an electromagnet and a stationary contact, an armature assembly having a movable contact to engage said stationary contact and being pivotally connected with said structure for angular motion relative to said magnet, a spring for biasing said assembly in contact opening direction away from said magnet, a member pivotally arranged for angular motion relative to said armature about a pivot axis substantially coinciding with that of said armature, said armature and said member having two pairs of contacts angularly displaced with respect to each other so as to be closed successively upon motion of said member toward said armature, a spring for biasing said member toward said armature so as to normally close said pairs of contacts, and a timing mechanism connected with said member for unidirectional operation so as to retard the motion of said member toward said armature while being ineffective during motion of said member in the opposite direction.

LAWRENCE PIERCE.
RALPH B. IMMEL.